United States Patent [19]

Bergh

[11] 4,097,634

[45] Jun. 27, 1978

[54] THERMOPLASTIC RESIN MOLDING OF COMPLEX DECORATIVE RELIEF

[75] Inventor: Eugene H. Bergh, St. Paul, Minn.

[73] Assignee: Minnesota Mining and Manufacturing Company, St. Paul, Minn.

[21] Appl. No.: 678,363

[22] Filed: Apr. 19, 1976

[51] Int. Cl.² .............................................. B32B 3/02
[52] U.S. Cl. ................................... 428/156; 264/171; 264/175; 264/216; 425/327; 425/385; 428/355
[58] Field of Search ........ 264/175, 171, 284, 161–163, 264/293, 212, 216, 146, 151; 425/324, 325, 327, 385; 156/243–244, 231, 232; 428/156, 355

[56] References Cited

U.S. PATENT DOCUMENTS

| | | | |
|---|---|---|---|
| 2,364,248 | 12/1944 | Spencer | 264/146 |
| 2,590,186 | 3/1952 | Land | 264/175 |
| 3,010,861 | 11/1961 | Reese | 156/244 |
| 3,196,196 | 7/1965 | Burbank | 264/251 |
| 3,256,376 | 6/1966 | Leedy et al. | 264/151 |
| 3,311,692 | 3/1967 | Baird | 264/284 |
| 3,312,583 | 4/1967 | Rochlis | 264/284 |
| 3,434,903 | 3/1969 | Hann | 156/244 |
| 3,481,818 | 12/1969 | Wellen | 156/244 |
| 3,555,601 | 1/1971 | Price | 264/177 R |
| 3,689,346 | 9/1972 | Rowland | 264/212 |
| 3,843,475 | 10/1974 | Kent | 264/177 R |

OTHER PUBLICATIONS

Machine Design—"Plastics Parts by the Mile"—Dreger, Sep. 4, 1975 ... pp. 64–65.

*Primary Examiner*—Jeffery R. Thurlow
*Attorney, Agent, or Firm*—Cruzan Alexander; Donald M. Sell; Robert E. Granrud

[57] ABSTRACT

Essentially continuous thermoplastic resin molding of complex decorative relief is produced by continuously extruding molten resin into a rotating forming wheel and cooling and removing the molded resin from the wheel. A doctor wheel cooperates with the forming wheel to provide a flat surface to which a pressure-sensitive adhesive layer may be applied for bonding the resin molding to an intended substrate.

9 Claims, 4 Drawing Figures

THERMOPLASTIC RESIN MOLDING OF COMPLEX DECORATIVE RELIEF

FIELD OF THE INVENTION

This invention concerns elongate thermoplastic resin moldings, and specifically moldings having a complex decorative relief.

BACKGROUND OF THE INVENTION

Elongate thermoplastic resin moldings, such as may be cut to short lengths and applied to the side of an automobile for protective and decorative purposes, are conveniently extruded as continuous strips. Often the moldings are embossed by patterned squeeze rollers upon emerging from the extruder, e.g., to provide a leather-grain pattern. Attempts at creating an extruded thermoplastic resin strip of complex decorative relief have not been entirely successful in that deeply embossed squeeze rollers would introduce internal strains that would tend to distort the moldings. Also, it would be difficult to control the flash which necessarily would be quite extensive in order to insure a complete pattern. These problems would complicate the application of an adhesive transfer tape to the molding.

Because of such problems, elongate thermoplastic resin moldings of complex decorative relief are generally formed by pouring or injecting molten plastic into open or closed molds. Not only are such techniques slow, but the length of the molding is limited by the size of the mold. On the other hand, it is easy and convenient to provide the molding with an adhesive layer simply by placing transfer tape in the mold before adding the molten resin.

OTHER PRIOR ART

The prior art which in hindsight appears to be most pertinent to the present invention is a publication which does not concern elongate plastic moldings but instead relates to the production of small plastic parts, i.e., "Plastic Parts by the Mile", *Machine Design*, Sept. 4, 1975, pages 64–65. As there illustrated, thermoplastic resin is injected into a few of a plurality of cavities around a rotary drum mold. After a skin forms, the drum mold is retracted from the injection-molding machine, rotated to index other cavities, moved back into position, and resin is again injected. The cavities are interconnected by short, shallow channels so that the hot resin fuses with the previously molded parts to link them into a continuous chain which is sequentially pulled from the mold.

Also pertinent prior art may be involved in the manufacture of rubber timing belts which may be essentially continuous and have a deep, but not complex relief. It is not known how these are manufactured.

THE PRESENT INVENTION

The present invention permits the production of thermoplastic resin molding of complex decorative relief on a continuous, economical basis and is adapted to convenient application of a functional adhesive layer to the molding during its production. The resultant resin molding is essentially free from external defects and internal strains and is characterized by uniformity over its entire, essentially continuous length. The novel resin molding is formed on a continuously rotating forming wheel having a complex intaglio in its circumferential surface and doctor means providing an orifice tangential to the forming wheel and a pair of interstices at the sides of the orifice. It is produced by:

(1) heating thermoplastic resin to a molten state,
(2) providing a bank of the molten resin in contact with the forming wheel at the leading edge of the orifice sufficient to fill the intaglio as the forming wheel rotates and to flow through said interstices to provide a pair of resin flashes,
(3) cooling the resin deposited in the intaglio while the forming wheel continues to rotate until the resin develops tenacity at least at its surface contacting the intaglio, and
(4) continuously removing the cooled resin molding from the intaglio.

The continuous rotation of the forming wheel past the bank of resin carries enough resin past the orifice to fill the intaglio to the height of the orifice. By virtue of the complex intaglio in the surface of the forming wheel, the molding takes on a complex decorative relief such as was heretofore available on a practical commercial basis only on an individual strip basis. By "complex" decorative relief is meant a relief having both differing longitudinal cross-sections and differing transverse cross-sections (as opposed to rubber timing belts which have differing cross-sections only in the transverse direction).

The only strains introduced into the molding are caused by the cooling and are of a minimal nature so that the molding is essentially distortion-free. By using an orifice which gives the molding an essentially flat open surface, an adhesive layer may be applied conveniently by rolling a transfer tape into contact with that surface, preferably before the molding is removed from the forming wheel. The temporary backing member of the transfer tape may remain in place to keep the adhesive clean, being removed immediately prior to application of the molding to an intended substrate. Such protection is especially desirable when the adhesive is pressure-sensitive.

Preferably the transfer tape incorporates a foam cushioning layer between two pressure-sensitive adhesive layers, one of which bonds to the plastic molding, the other bonding the resin molding to the intended substrate.

By virtue of the continuous rotation of the forming wheel, very high rates of production are feasible. The continuous rotation simplifies application of adhesive transfer tape and the winding of the adhesive-bearing resin molding upon itself into roll form for convenient storage and shipment.

Thermoplastic resins which can be used in the present invention include polyethylene, plasticized polyvinyl chloride, blends of polyvinyl chloride with nitrile rubber such as B. F. Goodrich 83992 or with other elastomers such as duPont "Hytrel" 4056 and B. F. Goodrich 83791, styrene-terminated block copolymers such as Shell "Kraton" 7720, polyolefin rubbers such as Uniroyal EPDM 0.019 and 0.010. The thermoplastic resins may be blended with materials with which they are commonly used, for example, pigments and other ultraviolet-inhibiting materials, antioxidants, lubricants and inert fillers.

THE DRAWING

Figure 1:
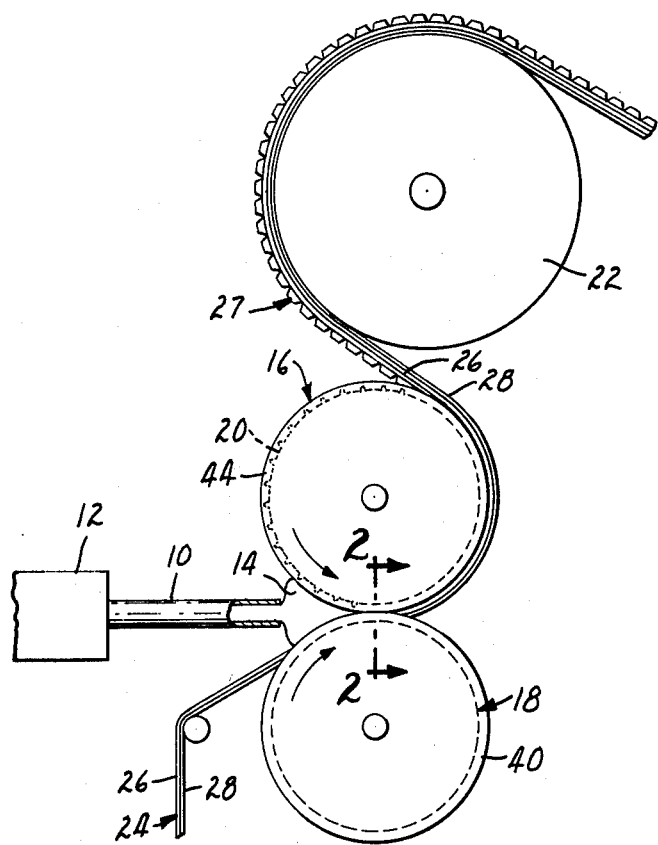
FIG. 1 is a schematic elevation of apparatus for producing adhesive-bearing resin molding in the practice of the invention.

Referring to FIG. 1, molten thermoplastic resin is extruded through the nozzle 10 of a screw-type extruder 12 to form a bank or nip of molten resin 14 at an orifice between an aluminum forming wheel 16 and a steel doctor wheel 18 which rotate at the same uniform speed in the direction of the arrows. The forming wheel 16 has a complex intaglio in its circumferential surface consisting of a continuous series of symmetrical depressions 20. A network of channels (not shown) immediately beneath the depressions 20 carries cooling water to chill and solidify the molten resin. The molten resin 14 fills the depressions 20 and is solidified as it is cooled by water circulated through a network of channels (not shown) in the forming wheel 16 immediately beneath its depressions 20. After cooling to develop tenacity at least at its surface contacting the intaglio depressions, the resin molding is carried around an internally water-cooled roll 22 to cool the resin further.

A pressure-sensitive adhesive tape 24 is drawn by the doctor wheel 18 which presses the adhesive layer 26 of the tape against the molten resin 14. The tape remains firmly bonded to the solidified resin to provide an adhesive-bearing resin molding 27 having a backing member 28 to protect the pressure-sensitive layer 26. The backing member 28 has a low-adhesion surface facing the adhesive so that it can readily be pulled away and discarded to permit lengths of the adhesive-bearing resin molding 27 to be applied to an intended substrate. Preferably, the pressure-sensitive adhesive layer 26 has a foam construction, as seen in FIG. 4, consisting of a central foam 30 bearing pressure-sensitive adhesive coatings 32 and 34 on both sides.

Figure 2:
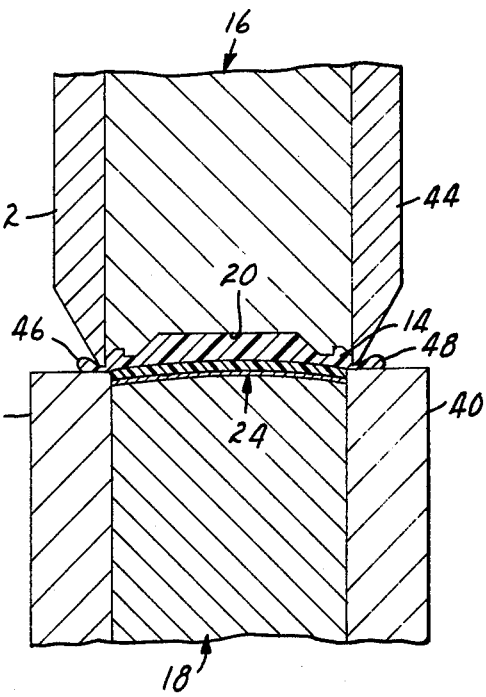
FIG. 2 is an enlarged schematic cross-section along line 2—2 of FIG. 1.

As seen in FIG. 2, the circumference of the doctor wheel 18 has a crown shape to aid in achieving a flat adhesive-bearing surface. Bolted to the sides of the doctor wheel are a pair of hardened steel cylindrical anvils 38 and 40 which cooperate with a pair of steel cylindrical knives 42 and 44 bolted to the forming wheel 16. The knives may be spaced from the anvils 38 and 40 by about 0.125 mm to provide a pair of interstices through which exceeds resin flows to form resin flash at 46 and 48. The flash cools and hardens quickly and cooperates with the knives 42 and 44 which act as tenters to inhibit lateral shrinkage of the resin as it cools in contact with the forming wheel 16. By cooling the resin against the slightly crowned surface of the roll 22, its adhesive-bearing surface develops the desired flatness. This tends to control the shrinkage of the resin so that only the decorative surfaces are affected. The resultant slight concavities at 50 and 52 of FIG. 4 provide an attractive highlighting.

Figure 3:
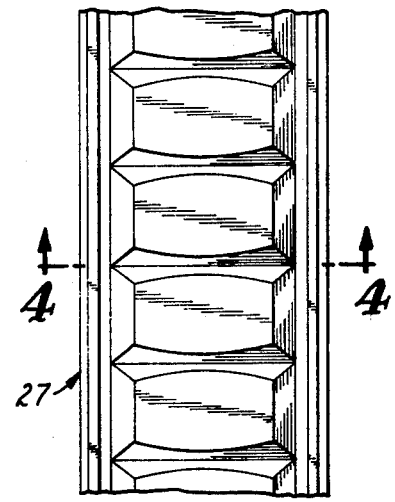
FIG. 3 illustrates the face of the resin molding produced on the apparatus of FIGS. 1 and 2.
Figure 4:
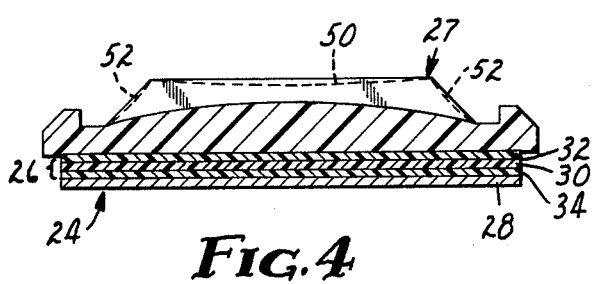
FIG. 4 is a schematic cross-section along line 4—4 of FIG. 3.

The resin flash is slit away prior to windup to provide the adhesive resin molding 27 illustrated in FIGS. 3 and 4.

EXAMPLE

The adhesive-bearing resin molding 27 has been made as schematically illustrated in FIGS. 1 and 2 using the following thermoplastic resin composition:

|  | Parts by weight |
|---|---|
| Polyvinyl chloride | 100 |
| Polymeric polyester plasticizer | 60 |
| Calcium carbonate | 18.5 |
| Metal salt stabilizers | 3 |
| Epoxidized soybean oil | 5 |
| Brown color concentrate containing aluminium flakes for metallic effect | 2 |

The pressure-sensitive adhesive layer 26 consisted of a thin neoprene foam having on each side a coating of pressure-sensitive adhesive consisting of a copolymer of 90 parts isooctyl acrylate and 10 parts by weight of acrylic acid. The neoprene foam was closed cell, 800 kg/m$^3$ and 0.75 mm in thickness. The low-adhesion backing member 28 was a thin polyethylene film.

The thermoplastic resin composition at a temperature of 185° C was extruded through a nozzle 10 of 1.3-cm inside diameter while the rolls 16 and 18 were rotated at the constant speed of eight revolutions per minute. The finished adhesive-bearing resin molding 27 was approximately 0.5 cm in thickness and, after slitting off the resin flash, 3.2 cm in width. It was wound upon itself for storage and shipment. Subsequently the polyethylene film was peeled away from strips of the resin molding to permit each strip to be bonded by its exposed adhesive layers to the complete periphery of a funeral casket as a decorative molding affording bump protection.

Another pressure-sensitive adhesive layer 26 which has been used successfully in place of the above-described pressure-sensitive adhesive layer consisted of a thin neoprene foam having a coating of pressure-sensitive adhesive on one side as described above and a thermoplastic coating on the other side. The thermoplastic coating was selected to form a strong bond upon contacting the molten resin 14. If the foam were of a material which would strongly bond to the molten resin, there would be no need for any coating between the foam and the thermoplastic resin.

I claim:

1. Process for forming essentially continuous thermoplastic resin molding on a continuously rotating forming wheel having a complex intaglio in its circumferential surface and doctor means providing an orifice tangential to the forming wheel and a pair of interstices at the sides of the orifice comprising the steps of
   (1) heating the thermoplastic resin to a molten state,
   (2) providing a bank of the molten resin in contact with the forming wheel at the leading edge of the orifice sufficient to fill the intaglio as the forming wheel rotates and to flow through said interstices to provide a pair of resin flashes,
   (3) cooling the resin deposited in the intaglio while the forming wheel continues to rotate until the resin develops tenacity at least at its surface contacting the intaglio, and
   (4) continuously removing from the intaglio a cooled resin molding which has complex decorative relief and yet is essentially free from external defects and internal strains.

2. Process as defined in claim 1 wherein a transfer tape comprising a pressure-sensitive adhesive layer and a removable, low-adhesion backing member is drawn by the doctor means with its adhesive layer in contact with the bank of molten resin to provide an adhesive-bearing resin molding.

3. Process as defined in claim 1 wherein step (3) involves holding the resin flashes as the resin is carried by the rotating forming wheel to inhibit lateral shrinkage.

4. Process as defined in claim 2 wherein said pressure-sensitive adhesive layer comprises a cushioning foam having a pressure-sensitive adhesive coating on the side which does not contact the molten thermoplastic resin.

5. Essentially continuous thermoplastic resin molding of complex relief made by the process defined in claim 1.

6. Essentially continuous pressure-sensitive adhesive-bearing thermoplastic resin molding of complex relief made by the process defined in claim 2.

7. Apparatus for forming essentially continuous thermoplastic resin molding of complex decorative relief comprising
    (a) a forming wheel having a complex intaglio in its circumferential surface,
    (b) means for continuously rotating the forming wheel,
    (c) doctor means providing an orifice tangential to the forming wheel and a pair of interstices at the sides of the orifice,
    (d) means for heating thermoplastic resin to a molten state,
    (e) means for providing a bank of the molten resin in contact with the forming wheel at the leading edge of the orifice sufficient to fill the intaglio as the forming wheel rotates and to flow through said interstices to provide a pair of resin flashes,
    (f) means for cooling the resin deposited in the intaglio while the forming wheel continues to rotate until the resin develops tenacity at least at its surface contacting the intaglio, and
    (g) means for continuously removing the cooled resin deposit from the intaglio.

8. Apparatus as defined in claim 7 wherein a pair of knives adjacent the forming wheel and a pair of anvils adjacent the doctor means provide said pair of interstices at each side of the orifice to provide an outlet for excess resin.

9. Apparatus as defined in claim 8 wherein the knives are coaxial with and fixed to the sides of the forming wheel to act as tenters to inhibit lateral shrinkage of the resin as it cools in contact with the forming wheel.

* * * * *